United States Patent [19]

Sugie et al.

[11] Patent Number: 4,866,782

[45] Date of Patent: Sep. 12, 1989

[54] PATTERN RECOGNITION METHOD

[75] Inventors: Kazuo Sugie, Saitama; Yoshimasa Sainen, Ooita; Yuji Kimura; Tadashi Nishiyama, both of Yokohama, all of Japan

[73] Assignee: Tokyo Electron Limited, Tokyo, Japan

[21] Appl. No.: 250,863

[22] Filed: Sep. 29, 1988

[30] Foreign Application Priority Data

Oct. 2, 1987 [JP] Japan .................. 62-249197
Oct. 2, 1987 [JP] Japan .................. 62-249198

[51] Int. Cl.$^4$ .................. G06K 9/52
[52] U.S. Cl. .................. 382/22; 383/8; 250/560; 356/387; 356/384; 358/107; 364/563
[58] Field of Search .................. 382/8, 22, 53, 10; 356/384, 385, 386, 387; 364/562, 563; 250/560; 358/107

[56] References Cited

U.S. PATENT DOCUMENTS

| | | | |
|---|---|---|---|
| 3,936,665 | 2/1976 | Donoghue | 364/563 |
| 4,570,180 | 2/1986 | Baier et al. | 382/22 |
| 4,656,663 | 4/1987 | Jansson et al. | 382/8 |
| 4,744,662 | 5/1988 | Suto et al. | 356/387 |
| 4,811,410 | 3/1989 | Amir et al. | 382/8 |

Primary Examiner—Leo H. Boudreau
Assistant Examiner—Yon Jung
Attorney, Agent, or Firm—Oblon, Spivak, McClelland, Maier & Neustadt

[57] ABSTRACT

According to this invention, light is radiated on a pattern to be measured while being scanned, and light reflected by the pattern is received so as to form a light intensity profile curve based on the reflection light corresponding to the pattern width of the pattern to be measured. Then, coefficients of optimal values are calculated by the method of least squares using three sets or more of pattern width values and light intensity values obtained from the light intensity profile curve. A pattern width value (X1) of the pattern to be measured is calculated using equation (II) below having these optimal values as coefficients. A very small line width of a resist film can be easily and accurately measured as a bottom value using an optical apparatus without being influenced by light interference at an edge portion of the pattern to be measured.

$$y1 = d/\{1 + a1 \cdot \exp(-b1X1)\} \quad \text{(II)}$$

$$y1 = a1_1 X^{n-2} + a1_2 X^{n-3} \ldots cl \quad \text{(IV)}$$

10 Claims, 4 Drawing Sheets

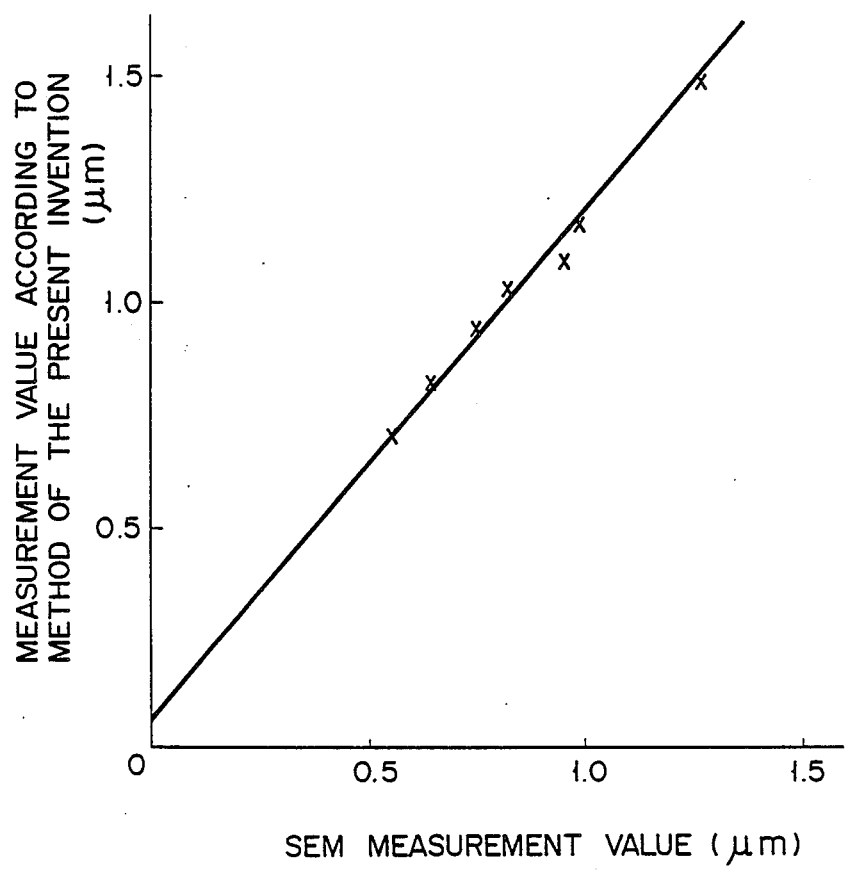
F I G. 5

PATTERN RECOGNITION METHOD

BACKGROUND OF THE INVENTION

1. Field of the Invention

The present invention relates to a pattern recognition method.

2. Description of the Prior Art

In recent years, techniques associated with pattern recognition have been remarkably advanced. The pattern recognition techniques are utilized in a variety of fields such as reading of characters or figures, recognition of shapes of articles, dimensional measurement of articles, and the like.

For example, in the field of manufacture of a semiconductor device, a pattern recognition technique is utilized for measuring a line width of a resist film formed on a semiconductor wafer. The line width of the resist film is measured as follows. First, a semiconductor wafer is irradiated with light. Light reflected by the wafer is imaged by a two-dimensional camera or the like, thus obtaining image data associated with the intensity and coordinates of the reflection light. In this case, the sectional shape of resist film 11 is as shown in, e.g., FIG. 1. More specifically, side wall portion 11a of resist film 11 is moderately extended outwardly. Therefore, light interference occurs at the edge portion of resist film 11. A signal based on light causing interference at the edge portion of resist film 11 varies with noise. For this reason, the line width of resist film 11 is calculated with reference to a portion indicating an intermediate light intensity between a light intensity on the resist film 11 portion and a light intensity on a substrate portion immediately below resist film 11.

However, in the field of manufacture of a semiconductor device, the degree of integration has been improved. For example, a wiring pattern constituting an integrated circuit tends to be micropatterned to 1 $\mu$m or less. In contrast to this, a conventional pattern recognition method cannot perfectly eliminate an error based on light interference as described above. As a result, in the conventional method, the above-mentioned very small line width cannot be accurately measured.

When the line width of resist film 11 is to be measured, it is important to determine the line width (bottom value) at a bottom portion of resist film 11 contacting the substrate. However, in the conventional method, the line width as the bottom value is calculated based on an average value of light intensities reflected by the inclined side surface of resist film 11. As a result, when the pattern of resist film 11 changes, a difference between the line width value of resist film 11 measured by the conventional method and a line width value based on a true bottom value is increased.

In order to eliminate the above problem, the very small line width of resist film 11 is measured using a scanning electron microscope (SEM). In this case, however, a large-scale SEM is required. In addition, in order to measure a line width, much labor and time are required, and the conventional method is not suitable for mass-production.

SUMMARY OF THE INVENTION

It is an object of the present invention to provide a pattern recognition method which can automatically and accurately measure a very small line width of a resist film or the like as a bottom value using an optical apparatus.

According to the present invention, there is provided a pattern recognition method comprising:

the step of radiating scanning light to cross a pattern to be measured;

the step of receiving reflection light of the scanning light and converting the received light into an electrical light intensity signal;

the step of making a light intensity profile curve of a light intensity of the reflection light as a function of a position on the pattern to be measured on a coordinate system wherein the position on the scanned pattern to be measured is plotted along the abscissa, and the light intensity represented by the light intensity signal is plotted along the ordinate;

the step of obtaining, from the light intensity profile curve, at least three sets of pattern width values (X) and corresponding light intensity values (Y) between leading and trailing portions of the light intensity profile curve;

the step of obtaining optimal values (a1, b1) of coefficients a and b in equation (I) below by the method of least squares using the at least three sets of pattern width values (X) and light intensity values (y); and the step of calculating, from equation (II) below having the optimal values (a1, b1) as coefficients, a pattern width value (X1) of a portion corresponding to a region of the pattern to be measured which is scanned by the scanning light, $$y = d/\{1 + a \cdot exp)(-bX)\} \qquad (I)$$

$$y1 = d\{1 + a1 \cdot exp(-b1X1)\} \qquad (II)$$

where d in equations (I) and (II) is a preset constant.

The present invention can be applied to measurement of a pattern width of a pattern to be measured comprising a micropattern such as a resist film or the like formed on a semiconductor substrate.

As a means for receiving reflection light and converting the received light into an electrical light intensity signal, a two-dimensional camera comprising a solid-state imaging element or the like can be used.

As a means for generating a light intensity profile curve, an image analysis apparatus can be employed.

If the number of data of pattern width values X and corresponding light intensity values Y is given as n (n ≧ 3), the following equation (III) can be employed in order to calculate pattern width value X1:

$$y = a1X^{n-2} + a2N^{n-3} \ldots + c \qquad (III)$$

According to the method of the present invention, when equation (I) to be described later is used, three sets or more of pattern width values X and light intensity values Y obtained from the light intensity profile curve are used, and optimal values a1 and b1 of coefficients a and b in equation (I) are calculated by the method of least squares. A pattern width value of a pattern to be measured is calculated from the following equation (II) having optimal values a1 and b1 as coefficients:

$$y = d/\{1 + a \cdot exp(-bX)\} \qquad (I)$$

$$y1 = d/\{1 + a1 \cdot exp(-bX1) \qquad (II)$$

When equation (II) is employed, if the number of data of pattern width values X and corresponding light intensity values Y is given as 4, optimal values $a1_1$, $a2_2$, and $c1$ of coefficients $a1$, $a2$, and $c$ in equation (V) are calculated by the method of least squares, and pattern width value X1 is calculated by equation (VI) including coefficients $a1_1$, $a2_1$, and $c1$:

$$y = a1X^2 + a2X^1 + c1 \tag{V}$$

$$y1 = a1_1 X^2 + a1_2 X^1 + c1 \tag{VI}$$

In this manner, according to the present invention, pattern width value X1 of the pattern to be measured is calculated from equations (II), (IV), and (VI). As a result, pattern width X1 can be accurately and easily obtained as a bottom value without being influenced by noise due to light interference at the edge portion of the pattern to be measured.

BRIEF DESCRIPTION OF THE DRAWINGS

FIG. 5 is a graph showing the relationship between a pattern width value measured in the embodiment shown in FIG. 2 and a pattern width value measured by a scanning electron microscope.

DETAILED DESCRIPTION OF THE PREFERRED EMBODIMENT

An embodiment of the present invention will be described hereinafter with reference to the accompanying drawings. In this embodiment, a pattern recognition method of the present invention is applied to measurement of a line width of a resist film formed on a semiconductor substrate.

Figure 1:
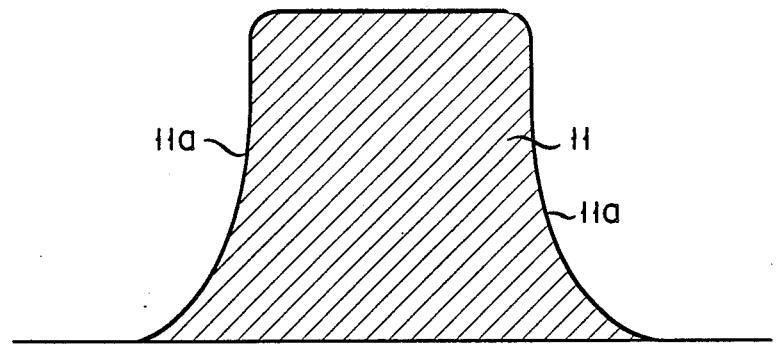
FIG. 1 is a sectional view of a resist film, a pattern width of which is measured by a conventional pattern recognition method.
Figure 2:
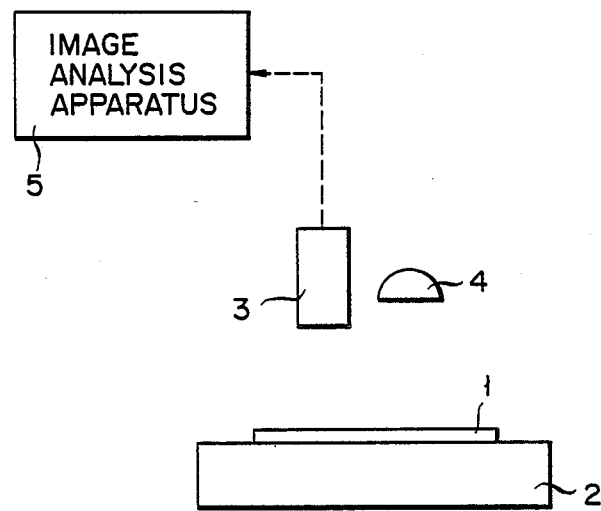
FIG. 2 is a diagram showing a schematic arrangement of an apparatus used in a pattern recognition method according to an embodiment of the present invention.

In FIG. 2, reference numeral 1 denotes a semiconductor substrate placed on table 2. Two-dimensional camera 3 and light source 4 are arranged above semiconductor substrate 1 to oppose the surface of substrate 1. Two-dimensional camera 3 comprises, e.g., a solid-state imaging element. Camera 3 is electrically connected to image analysis apparatus 5. As light source 4, a conventional light source or a laser light source may be employed.

Figure 3:
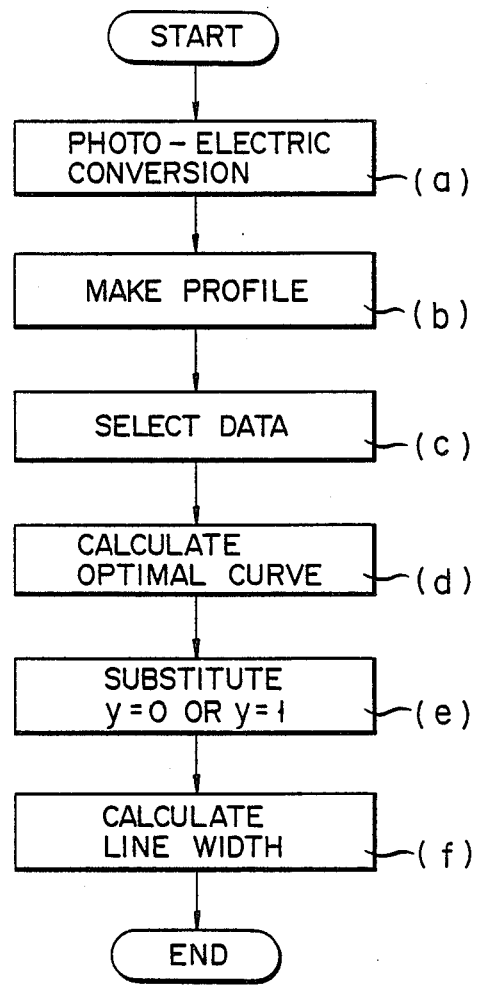
FIG. 3 is a flow chart showing steps of the pattern recognition method according to the embodiment shown in FIG. 2.

In this embodiment, a line width of a resist film formed on semiconductor substrate 1 is measured as shown in FIG. 3 using the apparatus with the above arrangement.

More specifically, light is radiated from light source 4 on a resist film while being scanned. More specifically, light radiation is performed to be scanned from one side to the other side of the surface of substrate 1 across the resist film. Scanning of radiated light may be performed by moving light source 4 by a drive mechanism (not shown) with respect to substrate 1. Alternatively, scanning of radiated light may be performed by moving table 2 on which substrate 1 is placed with respect to light source 4. Light reflected by the resist film is sequentially received by two-dimensional camera 3. In camera 3, the received optical signal is converted into an electrical light intensity signal (FIG. 3(a)).

Camera 3 supplies the obtained light intensity signal to image analysis apparatus 5 (FIG. 3(b)). Apparatus 5 plots the light intensity of the reflection light in correspondence with the position on the resist film on a coordinate system wherein the position on the resist film irradiated with scanning light is plotted along the abscissa, and the light intensity of the light intensity signal is plotted along the ordinate, thereby producing light intensity profile curve P.

Then, for example, three sets of pattern width values X1, X2, and X3, and corresponding light intensity values Y1, Y2, and Y3 between leading and trailing portions Pu and Pd of profile curve P are selected from curve P (FIG. 3(c)). Pattern width values X1, X2, and X3 and light intensity values Y1, Y2, and Y3 are selected from leading and trailing portions Pu and Pd to avoid the edge portion near the surface of semiconductor substrate 1, which is easy to cause light interference.

Selected pattern width values X1, X2, and X3, and light intensity values Y1, Y2, and Y3 are substituted in the following equation (I):

$$y = d / \{1 + a \cdot exp(-bX)\} \tag{I}$$

Using three types of values a1, a2, and a3, and b1, b2, and b3 of coefficients a and b of equation (I), a1 and b1, for example, are determined as optimal coefficients by the method of least squares. Note that d is a preset constant. In this embodiment, as constant d, a value twice the mask size during formation of a resist film is used. In general, constant d is properly selected in accordance with the size of a resist film during design.

Then, the following equation (II) having optimal coefficient values a1 and b1 is determined (FIG. 3(d)).

$$y1 = d / \{1 + a1 \cdot exp(-bX1)\} \tag{II}$$

A critical light intensity signal (e.g., y1=0 or y1=1) of light intensity profile curve P is substituted in y1 in equation (II). Using the equation obtained after substitution, a line width of the resist film is calculated by an arithmetic operation.

The line width value of the resist film calculated in this manner was plotted along the ordinate, and a line width value obtained by measuring the same resist film using a scanning electron microscope (SEM) was plotted along the abscissa, thus obtaining the correlation characteristic curve shown in FIG. 5. As can be seen from this correlation characteristic curve, the line width value of the resist film obtained by the method of the present invention has substantially the same accuracy as that measured by the SEM, and it was found that a so-called bottom value was accurately measured.

Figure 4A:
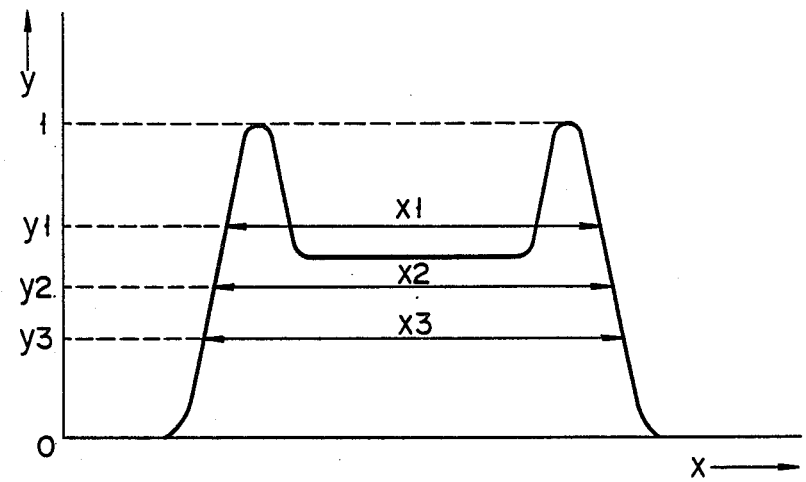
FIG. 4A is a graph for explaining a light intensity profile curve obtained in the embodiment shown in FIG. 2.
Figure 4B:
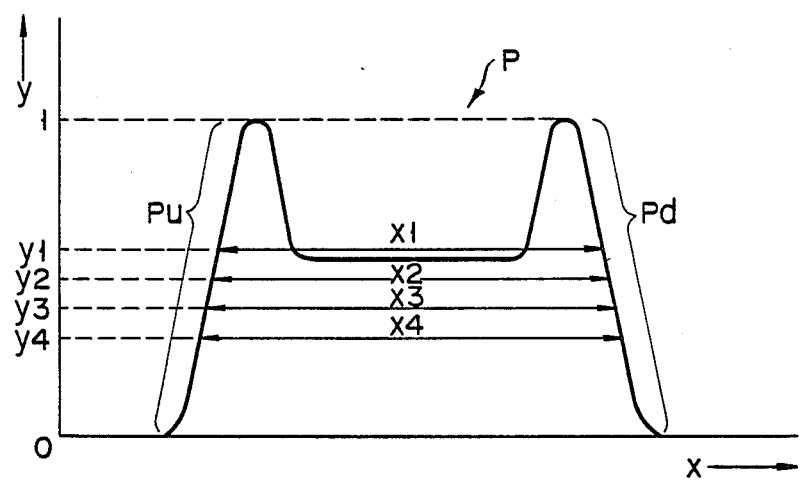
FIG. 4B is a graph showing another light intensity profile curve.

Note that in place of equation (I) used in the above embodiment, equation (III) below is used, and the number of data of pattern width values X and corresponding light intensity values Y is given as n (n≧3), as shown in FIG. 4B. Then, the following equation (IV) having optimal coefficients $a1_1$, $a2_1$, ..., $c1$ determined by the method of least squares is determined, so that the line width of the resist film can be accurately calculated as a bottom value from equation (IV).

$$y = a1X^{n-2} + a2X^{n-3} \ldots c \tag{III}$$

$$y1 = a1_1 X1^{n-2} + a1_2 X1^{n-3} \ldots c1 \tag{IV}$$

In the above embodiment, the present invention is applied to line width measurement of a resist pattern. However, the present invention can be applied to any other line portion recognition, i.e., pattern recognitions such as character recognition or cell pattern recognition.

What is claimed is:

1. A pattern recognition method comprising:
   the step of radiating scanning light to cross a pattern to be measured;
   the step of receiving reflection light of the scanning light and converting the received light into an electrical light intensity signal;
   the step of generating a light intensity profile curve of a light intensity of the reflection light as a function of a position on the pattern to be measured on a coordinate system wherein the position on the scanned pattern to be measured is plotted along the abscissa, and the light intensity represented by the light intensity signal is plotted along the ordinate;
   the step of obtaining, from the light intensity profile curve, at least three sets of pattern width values (X) and corresponding light intensity values (Y) between leading and trailing portions of the light intensity profile curve;
   the step of obtaining optimal values (a1, b1) of coefficients a and b in equation (I) below by the method of least squares using the at least three sets of pattern width values (X) and light intensity values (Y); and
   the step of calculating, from equation (II) below having the optimal values (a1, b1) as coefficients, a pattern width value (X1) of a portion corresponding to a region of the pattern to be measured which is scanned by the scanning light, $$y = d/\{1 + a \cdot exp(-bX)\} \tag{I}$$

$$y1 = d/\{1 + a1 \cdot exp(-b1X1)\} \tag{II}$$

where d in equations (I) and (II) is a preset constant.

2. A method according to claim 1, wherein a substrate is a semiconductor substrate, and the pattern to be measured is a micropattern on said semiconductor substrate.

3. A method according to claim 1, wherein means for receiving the scanning light and converting the received light into an electrical light intensity signal comprises a two-dimensional camera.

4. A method according to claim 3, wherein said two-dimensional camera comprises a solid-state imaging element.

5. A method according to claim 1, wherein means for generating the light intensity profile curve comprises an image analysis apparatus.

6. A method according to claim 1, wherein the number of data of the pattern width values (Y) and the corresponding light intensity values is given by n ($n \geq 3$), optimal values ($a1_1$, a2, ..., $an_n$, and c1) of coefficients a1, a2, ..., an, and c in equation (III) below are calculated by the method of least squares using the pattern width values (X) and light intensity values (Y), and the pattern width value (X1) of the pattern to be measured is calculated from equation (IV) below having the optimal values ($a1_1$, $a2_2$, ..., $an_n$, and c1) as coefficients, $$y = a1 X n - 2 + a2 X n - 3 \ldots c \tag{III}$$

$$y1 = a1_1 X1^{n-2} + a1_2 X1^{n-3} \ldots c1 \tag{IV}$$

7. A method according to claim 6, wherein a substrate is a semiconductor substrate, and the pattern to be measured is a micropattern formed on said semiconductor substrate.

8. A method according to claim 6, wherein means for receiving the scanning light and converting the received light into an electrical light intensity signal comprises a two-dimensional camera.

9. A method according to claim 8, wherein said two-dimensional camera comprises a solid-state imaging element.

10. A method according to claim 6, wherein means for generating the light intensity profile curve comprises an image analysis apparatus.

* * * * *